United States Patent [19]
Sara

[11] 4,379,812
[45] Apr. 12, 1983

[54] STRESS RELIEVED METAL/CERAMIC ABRADABLE SEALS AND DEFORMABLE METAL SUBSTRATE THEREFOR

[75] Inventor: Raymond V. Sara, North Olmstead, Ohio

[73] Assignee: Union Carbide Corporation, Danbury, Conn.

[21] Appl. No.: 171,830

[22] Filed: Jul. 24, 1980

Related U.S. Application Data

[62] Division of Ser. No. 973,553, Dec. 27, 1978, Pat. No. 4,243,169.

[51] Int. Cl.³ .................. B21H 3/00; F03B 11/00; F04D 29/08
[52] U.S. Cl. ............................... 428/577; 277/96.1; 415/174; 418/178; 418/179
[58] Field of Search ............. 428/577, 578; 415/174; 418/178, 179; 277/96.1

[56] References Cited

U.S. PATENT DOCUMENTS

| 2,873,517 | 2/1959 | Wellman | 75/208 R |
| 3,199,174 | 8/1965 | Nilsson et al. | 228/182 X |
| 3,359,623 | 12/1967 | Gwyn | 228/236 |
| 3,487,519 | 1/1970 | Davidson | 277/96.1 |
| 3,599,317 | 8/1971 | Purdy et al. | 228/239 |
| 3,661,233 | 5/1972 | Margett et al. | 428/578 |
| 3,673,677 | 7/1972 | Loqvist | 228/239 |
| 3,677,060 | 7/1972 | Loqvist | 72/476 |
| 3,975,165 | 8/1976 | Elbert et al. | 415/174 |
| 4,022,481 | 5/1977 | Long et al. | 277/96.1 |
| 4,135,851 | 1/1979 | Bill et al. | 415/174 |
| 4,273,824 | 6/1981 | McComas et al. | 415/174 |

FOREIGN PATENT DOCUMENTS 931268 7/1963 United Kingdom ............. 28/238

Primary Examiner—Mark Bell
Attorney, Agent, or Firm—John R. Doherty

[57] ABSTRACT

Metal/ceramic abradable seals of the type used in jet aircraft are improved by using a substrate which is able to deform during cooling from the brazing temperature and then rendering the substrate rigid after the cool down.

3 Claims, 11 Drawing Figures

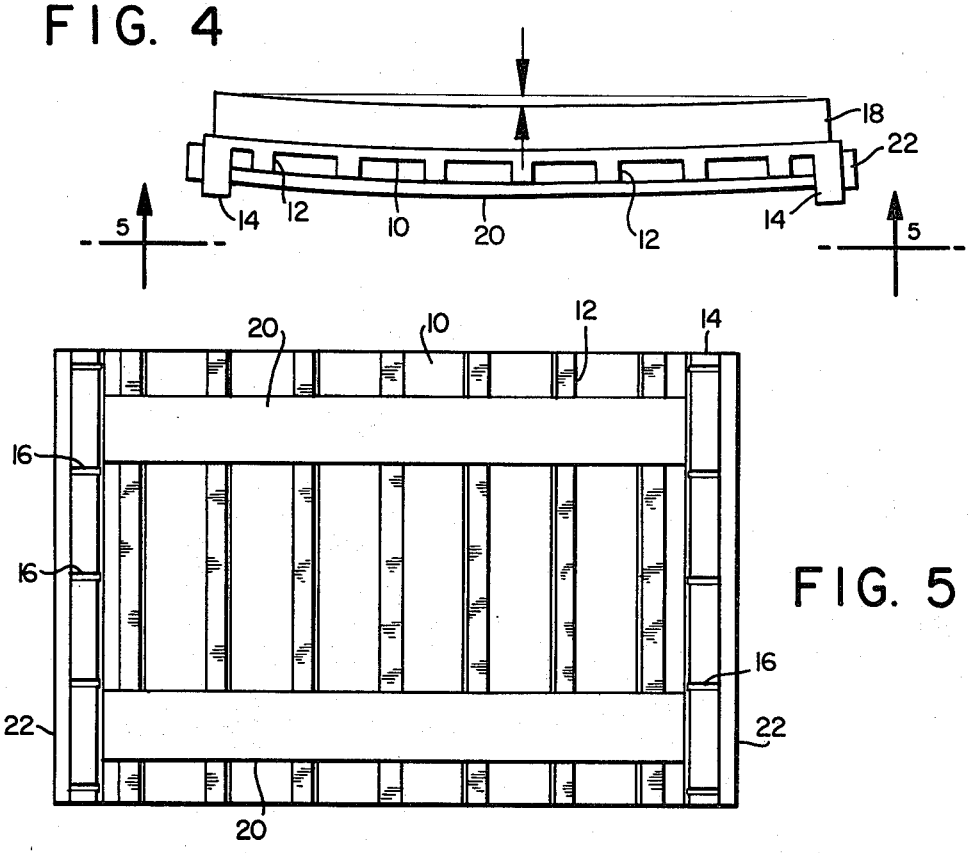
FIG. 4
FIG. 5
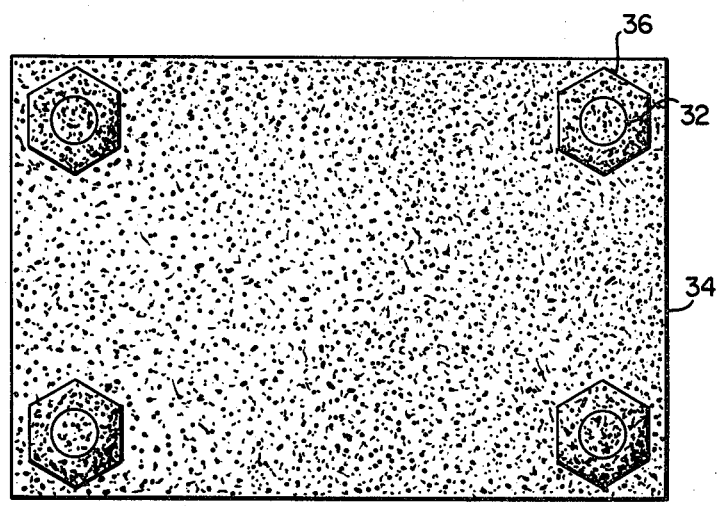
FIG. 8

STRESS RELIEVED METAL/CERAMIC ABRADABLE SEALS AND DEFORMABLE METAL SUBSTRATE THEREFOR

This application is a division of our prior U.S. application Ser. No. 973,553 filed Dec. 27, 1978, now U.S. Pat. No. 4,243,169 issued on Jan. 6, 1981.

This invention relates to metal/ceramic abradable seals of the type used in jet aircraft. More particularly, it relates to a method of making such seals in which stresses are minimized during cooling of the seal structure after fabrication.

A graded metal-to-ceramic structure for high temperature abradable seal applications is described and claimed in U.S. Pat. No. 3,975,165, together with a method of making it. Seals made according to the teachings of this patent contain appropriately formulated mixtures of metal and ceramic between the ceramic surface of the composite seal member and the substrate to which it is fused, whereby thermal expansion differences are reduced. As a result of the graded construction, shear stresses, which would likely cause failure of the seal, are significantly reduced.

Despite this reduction in shear stresses, however, residual stresses may remain large. For example, a nichrome-$ZrO_2$ structure isothermally cooled from bonding temperatures may develop residual compressive and tensile stresses in the ceramic and metal-rich layers, respectively. When the graded composite structure is attached to a stiff or rigid substrate such stresses occur and can build up rapidly. The dimensionally stable structure required for most applications therefore, is certain to develop large residual stresses after processing.

An object of the present invention, therefore, is to prepare sound ceramic/metal composite structures which are abradable and resistant to thermal shock. A further object is to prepare such structures in a simple economical manner which reduces stress in the final products. Yet another object is to provide in such manner a graded metal/ceramic structure capable of sustaining cyclic heating and cooling rates of at least 50° C. per second.

According to our invention, metal/ceramic abradable seals of the type used in jet aircraft are improved by sintering the seals while at the same time brazing or bonding them to a deformable substrate and then rendering the substrate rigid after cooling from the brazing temperature.

In the operation of our invention, the unsintered graded metal/ceramic composite is formed, compressed and then dried slowly. The thus formed composite is placed in the unsintered state on a deformable substrate, which preferably has a braze tape or fused coat of braze powder, and heated to a temperature sufficient to sinter the composite and braze or fuse the metal-rich surface of the composite to the substrate. A temperature of about 1200° C. is preferred for this brazing operation and is maintained for a sufficient time, typically about one hour. This heating step can be isothermal or a slight temperature gradient can be maintained, with the substrate up to 450° C. cooler than the ceramic surface of the composite. Preferably this heating is done in a vacuum or nonoxidizing atmosphere such as hydrogen. It is also preferred that moderate pressure be applied to force the composite and substrate together with about 5 psi having been found satisfactory.

When the temperature of these structures is near the braze temperature of about 1200° C. the pressure is preferably raised to from 5 to 225 psi in order to improve contact at the substrate/composite interface and to heal minor structural flaws. After fusion of the graded composite to the substrate is complete, usually about one hour, cooling to ambient temperature is begun. The substrate used according to the invention is deformable and all pressure and mechanical constraints, which might interfere with the deformation process, are removed for the cooling cycle. After cooling to ambient temperature stiffeners and rail hooks are welded to the substrate back side to rigidify the piece and facilitate attachment to the turbine housing.

Deformation occurs in graded metal/ceramic seal, such as a nichrome-$ZrO_2$ layer structure because the ceramic and metal parts contract differently when cooled. The deformation or displacement will decrease as the substrate rigidity increases. The alloys and thicknesses of the substrate affect rigidity and thus offset deformation as well.

IN THE DRAWING

FIG. 4 is a side elevation of a ribbed substrate as in FIG. 3 but with rigidifying rods welded in place.

FIG. 5 is a bottom view of the ribbed substrate of FIG. 4.

FIG. 8 is a top view of the fixture of FIG. 7.

Figure 1:
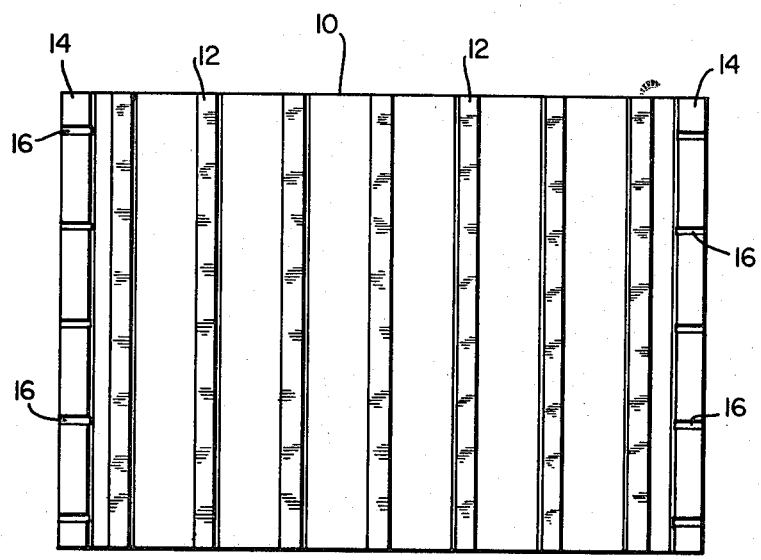
FIG. 1 is a bottom or backside view of a ribbed substrate according to the invention before it is bonded to the composite seal member.

In FIG. 1 is seen a bottom or backside of a ribbed substrate with the platform 10, ribs 12 and end ribs 14. The end ribs 14 have preferred slots 16 which relieve axial stresses.

Figure 3:
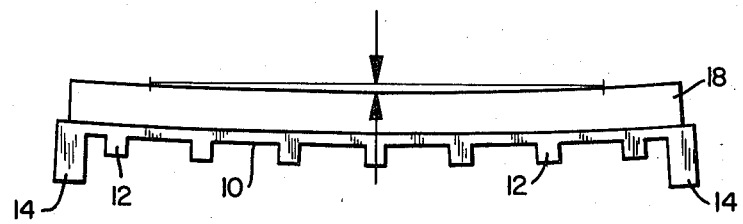
FIG. 3 is a side elevation of a ribbed substrate according to the invention after a metal/ceramic seal has been braze bonded to it.
Figure 2:
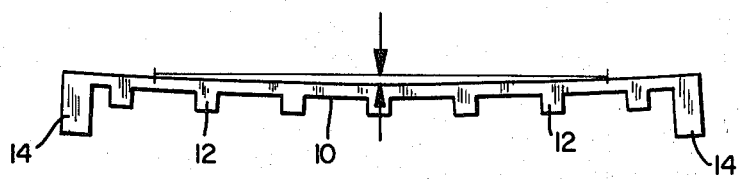
FIG. 2 is a side elevation of the substrate in FIG. 1.

FIG. 2 is a side elevation of the same rib substrate of FIG. 1. In FIG. 3 a metal/ceramic seal composite 18 has been brazed to the platform 10.

Figure 6:
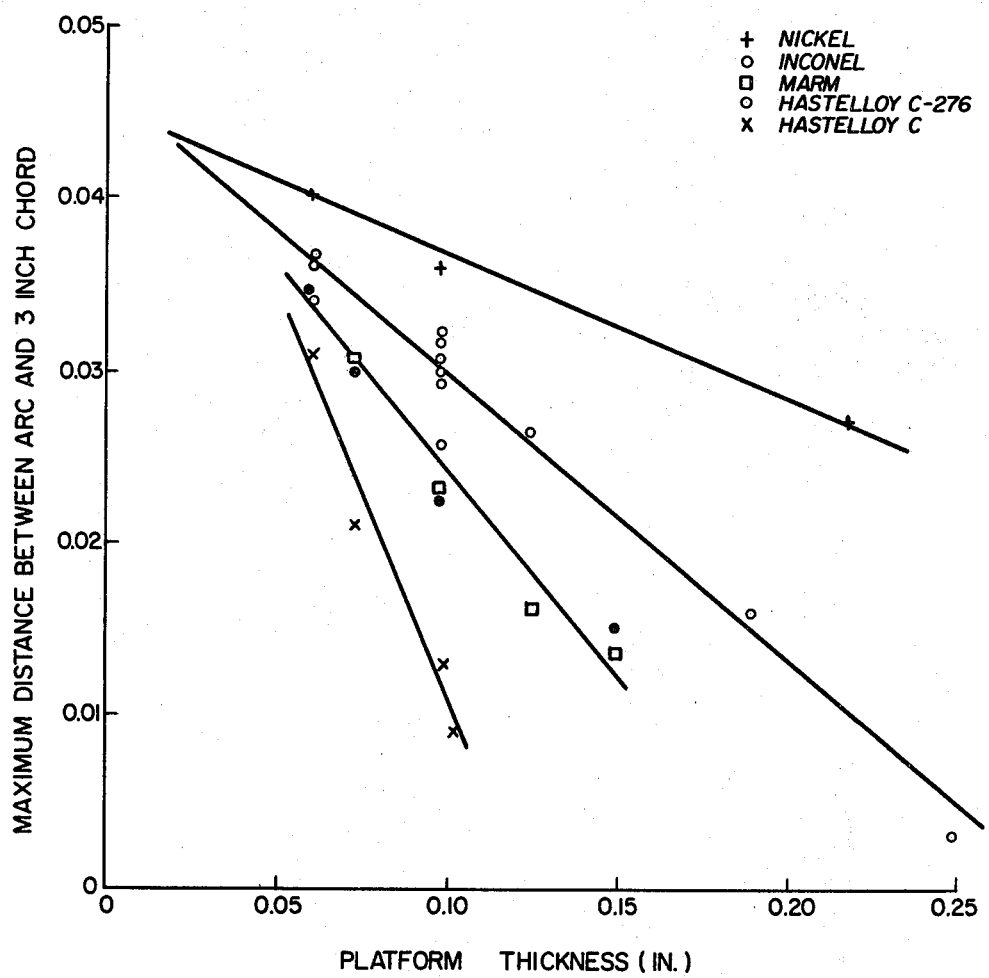
FIG. 6 is a graph showing the effect of substrate alloy and platform thickness on deformation of structures according to the invention.

In FIG. 4 the seal 18 is shown brazed to the platform 10 as in FIG. 3 but now rails 20 have been welded in place as circumferential stiffeners. In addition bars 22 have been welded to the end ribs 14 to further stiffen the structure. FIG. 5 is a bottom view of the stiffened structure of FIG. 4 and the same elements can be seen. The graph in FIG. 6 showing the effect of substrate alloy and platform thickness on deformation of the structures of the invention is self explanatory.

Figure 7:
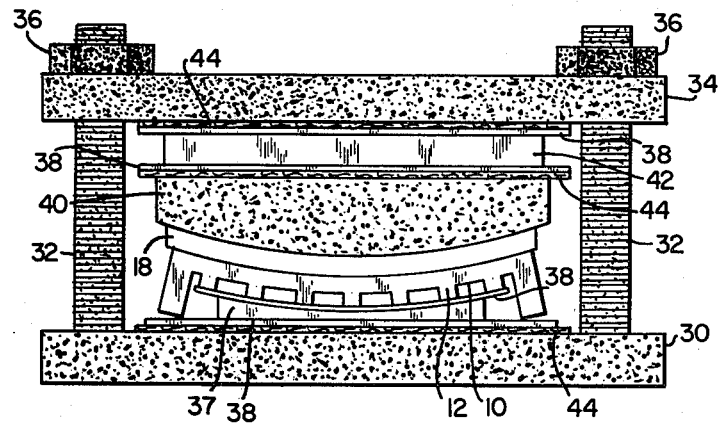
FIG. 7 is a side elevation of a fixture for holding a seal and substrate during furnacing.

FIG. 7 illustrates a type of fixture according to the invention for holding a seal composite and substrate during furnacing. A graphite bottom plate 30 has four graphite bolts 32 mounted on it and passing through an upper graphite plate 34. Graphite nuts 36 can be tightened to apply pressure downward on the structure. In FIG. 7 the basic support for the substrate platform 10 through its ribs 12 is a shaped stainless steel plate 37. Thin sheets of Inco 760 sheet 38 are positioned on either side of the shaped stainless steel plate 37 to prevent sticking. Above the metal/ceramic seal 18 is a shaped graphite pressure pad 40. Above the pad 40 is another layer or sheet of Inco 760 sheet and above that a steel plate 42. Sheets of fibrous Fiberfrax 44 are used to prevent sticking and to relieve pressure on the composite after brazing as they become plastic at braze temperature and relax. In top view of FIG. 8 can be seen the upper graphite plate 34, the ends of the graphite bolts 32 and the graphite nuts 36.

Figure 9:
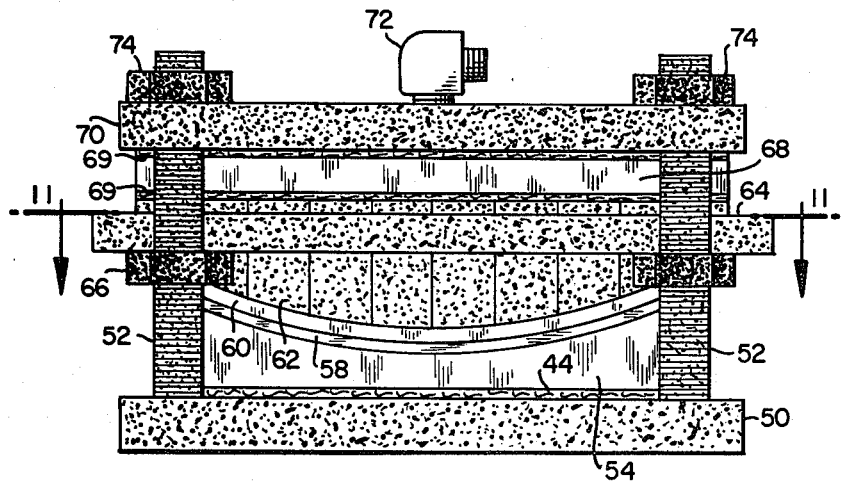
FIG. 9 is a side elevation of a furnacing fixture incorporating a segmented pressure pad and a pressure bladder.
Figure 10:
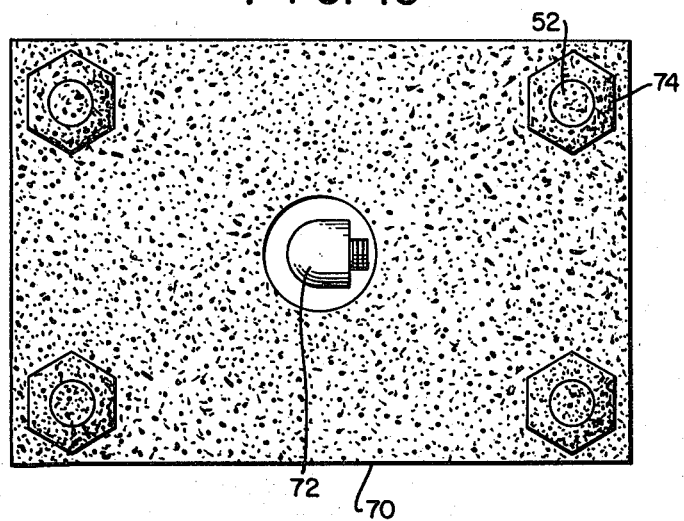
FIG. 10 is a top view of the fixture of FIG. 9.
Figure 11:
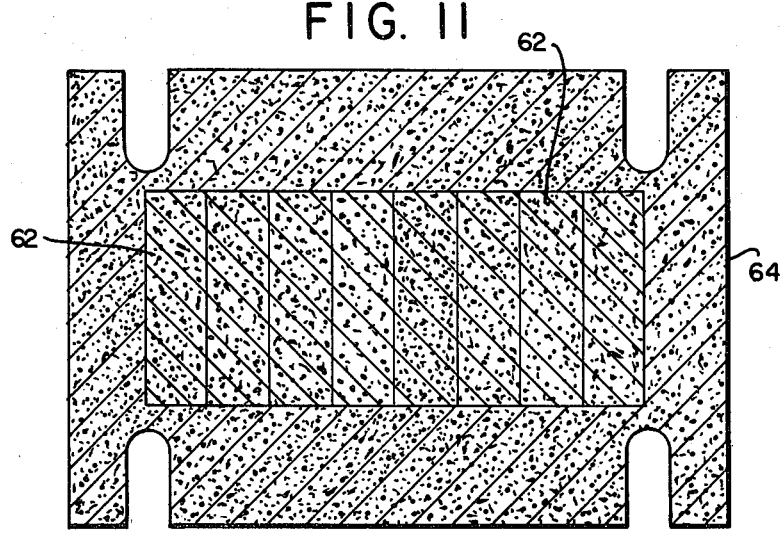
FIG. 11 is a section through FIG. 9.

A similar but different pressure system is shown in FIG. 9. A base plate 50 made of graphite has graphite bolts 52 positioned above it. A shaped steel plate 54 with a Fiberfrax sheet 44 below it supports the substrate platform 58 and composite seal 60. Exerting pressure on the composite 60 are segmented graphite pads 62 which are held in a graphite frame 64 supported on support nuts 66. A gas bladder 68 is positioned between the upper graphite plate 70 and the segmented graphite pads 62 with layers of zirconia cloth 69 on either side of the bladder 68. A gas fitting 72 is connected to the gas bladder 68 and extends up through the upper graphite plate 70 to access an outside source of gas not shown. Top nuts 74 maintain the upper graphite plate 70 in place as pressure is applied through inflation of the gas bladder 68.

EXAMPLE I

A six-layer graded composite was formed from the following materials:
A. 35/60 Tyler mesh $ZrO_2$ hollow spheres
B. 100/250 Tyler mesh. $ZrO_2$ broken spheres.
C. 35/60 Tyler mesh $ZrO_2$ agglomerate
D. 100/250 Tyler mesh $ZrO_2$ agglomerate
E. —325 mesh $ZrO_2$ powder
F. 100/250 Tyler mesh 80% Ni, 20% Cr powder
G. AMl-400 Braze powder (made by Alloy Metals Inc.)
H. Ludox 130M (a colloidal silica solution manufactured by E. I. du Pont Co.)

The composition of each of the six layers was as follows:

| Layer No. | Thickness in Inches | Percent Weight of | | | | | | Percent of Total A,B,C,D,E,F,G |
|---|---|---|---|---|---|---|---|---|
| | | A | B | C | D | E | F | G | H |
| 1 | 0.150 | 45 | 25 | — | — | 30 | — | — | 6.2 |
| 2 | 0.025 | — | — | 10 | 20 | 40 | 30 | — | 7.5 |
| 3 | 0.025 | — | — | 10 | 15 | 25 | 50 | — | 7.5 |
| 4 | 0.025 | — | — | 20 | 10 | 10 | 55 | 5 | 7.5 |
| 5 | 0.025 | — | — | 25 | — | — | 65 | 10 | 7.5 |
| 6 | 0.025 | Porous sheet of 80% Ni and 20% Cr Powder | | | | | | | |

Layers 1 through 5 were each mixed with sufficient water and Ludox 130M to form a damp mixture. Layer 1 was first spread in a mold to form a layer 2.40 inch by 4.05×0.150 inch thick. The mold has a radius of curvature of 10.97 inch. The remaining layers were stacked successively on top of the first and the total was pressed at 10,000 psi. The pressed compact was carefully dried at 5° C. and 15 percent relative humidity.

The substrate used was a curved Mar M 509 alloy plate measuring 4.00 inch by 3.10 inch by 0.125 inch thick. The substrate was axially stiffened with seven ribs spaced 0.350 inch apart and having a cross-section measuring 0.097 inch high by 0.200 inch wide. Two additional ribs at each end of the platform were 0.425 inch high by 0.200 inch wide with slots to the platform and spaced 0.500 inch apart. The Mar M 509 is a cobalt/chromium alloy made by Pratt and Whitney. The concave surface of the plate was carefully covered with AMl-400 braze tape.

Pressure bonding and sintering was done isothermally in the fixture shown in FIG. 7. The braze-coated surface of the Mar M alloy plate faced the metal-rich surface of the graded composite and the ceramic-rich surface was in contact with the concave graphite pressure pad. Special effort was taken to assure good alignment through the assembly. The graphite nuts on the restraining member are finally tightened uniformly to 2-2½ in. lbs.

The total assembly was inserted into a gas tight muffle. The muffle was flushed with Argon for 1 hour at 5.4 CFH. After purging, it was inserted into the furnace idling at 760° C. Hydrogen gas was then admitted into the muffle at a flow rate of 5.0 CFH and the Argon was lowered to 0.4 CFH. The furnace controller was adjusted to achieve a 1240° C. internal temperature. The indicated peak temperature was maintained for three hours after which the temperature was lowered to 760° C. The muffle was withdrawn when the furnace temperature reached 1000° C.

A sound structure with the graded composite well bonded to the curved substrate was obtained. Visual examination revealed no defects and measurements indicated deformation had occurred. The change in maximum distance between arc and three-inch chord in the radial direction for the substrate alone (y in FIG. 2) and the seal after welding to the substrate (y in FIG. 3), correspond to 0.025 inch. In the axial direction minor arching occurred which was not sufficient to affect the operability of the seal.

Two Hastelloy C-276 (a cobalt/chromium/nickel/molybdenum alloy made by Stellite Division of Cabot Corporation) rails measuring 0.500 inch wide and 0.125 inch thick were employed as circumferential stiffeners. The rails were formed to match the substrate curvature. They were symmetrically positioned on the substrate, spaced one inch apart, and laser welded to the ribs. The slotted end ribs were also stiffened by welding 0.375 inch wide by 0.125 inch thick flat bars. The substrate was cut to a 2.375 inch width to correspond with the composite dimension.

The specimen prepared in this example was thermally cycled 50 times under simulated turbine engine conditions. The severe cycle consisted of heating the ceramic surface from ambient to 1000° C. in 15 seconds, maintaining maximum temperature of 1250° C. for 60 seconds, cooling the surface to 600° C. in approximately 15 seconds, and repeating. Specimen integrity was considered excellent after this test.

EXAMPLE II

A six-layer graded composite was formed using materials and procedures described for Example I, except that the substrate had no axial ribs but was a simple curved plate or platform, a curved Hastelloy C-276 alloy plate measuring 4.06 inch×2.50 inch×0.125 inch thick.

Pressure bonding and sintering was done isothermally in the fixture of the type shown in FIG. 9. Furnacing procedures followed those described in Example I except the metal bladder was pressurized with 10 psi argon during the three-hour hold at peak temperature. The bladder was depressurized prior to cool-down.

A sound structure with the graded composite well bonded to the curved substrate was obtained. Visual examination revealed no defects and measurements indicated deformation had occurred. The largest change in maximum distance (y) in the radial direction between arc and three-inch chord corresponded to 0.025 inch. In the axial direction minor arching occurred which was not sufficient to affect the operability of the seal.

The specimen prepared in this example was thermally cycled 50 times under simulated engine conditions described in Example I. Specimen integrity was considered excellent after this test. Since the substrate was not stiffened prior to test as in Example I, the specimen underwent "ratcheting". That is, deformation occurred after each thermal cycle. In a specimen intended for use in an engine, stiffening ribs in an axial direction as well as circumferential rails would be welded or otherwise attached to the substrate in order to avoid the ratcheting or twisting.

What is claimed is:

1. A deformable metal substrate plate adapted for bonding to a multi-layer metal/ceramic abradable composite which comprises a metal plate curved in one plane to a predetermined radius such that the thermal stresses of bonding said metal/ceramic composite to said substrate plate will cause said substrate plate to assume a desired radius after said bonding, said substrate plate having at least two integral axial ribs.

2. A deformable metal substrate plate according to claim 1 wherein integral axial ribs are located at the edges of said substrate plate and also intermediate said edges and wherein said axial ribs at said edges are thicker than the intermediate ribs.

3. A deformable metal substrate plate according to claim 2 wherein said thicker edge ribs have multiple transverse slots at least partially through them.

* * * * *